US012759513B2

(12) United States Patent
Zhan et al.

(10) Patent No.: US 12,759,513 B2
(45) Date of Patent: Oct. 13, 2026

(54) AUXILIARY POSITIONING BRACKET AND VEHICLE CALIBRATION SYSTEM

(71) Applicant: SHENZHEN SMARTSAFE TECH CO., LTD., Shenzhen (CN)

(72) Inventors: Wei Zhan, Shenzhen (CN); Xinwei Xu, Shenzhen (CN)

(73) Assignee: SHENZHEN SMARTSAFE TECH CO., LTD., Shenzhen (CN)

( * ) Notice: Subject to any disclaimer, the term of this patent is extended or adjusted under 35 U.S.C. 154(b) by 309 days.

(21) Appl. No.: 18/713,509

(22) PCT Filed: Dec. 14, 2023

(86) PCT No.: PCT/CN2023/138779
§ 371 (c)(1),
(2) Date: May 24, 2024

(87) PCT Pub. No.: WO2025/086428
PCT Pub. Date: May 1, 2025

(65) Prior Publication Data

US 2026/0167158 A1 Jun. 18, 2026

(30) Foreign Application Priority Data

Oct. 24, 2023 (CN) ........................ 202322858865.9

(51) Int. Cl.
*G01B 11/275* (2006.01)
*B60S 5/00* (2006.01)
*F16M 13/02* (2006.01)

(52) U.S. Cl.
CPC ............... *B60S 5/00* (2013.01); *F16M 13/02* (2013.01); *G01B 11/275* (2013.01)

(58) Field of Classification Search
CPC ...... B60S 5/00; G01B 11/275; G01B 11/2755
(Continued)

(56) References Cited

U.S. PATENT DOCUMENTS 3,288,020 A * 11/1966 Lill ...................... G01B 11/275 33/288
3,758,958 A * 9/1973 Jordan .................. G01B 5/255 33/336
(Continued)

FOREIGN PATENT DOCUMENTS

CN 111442744 A 7/2020
CN 111609797 A 9/2020
(Continued)

*Primary Examiner* — George B Bennett
(74) *Attorney, Agent, or Firm* — Brooks Kushman P.C.

(57) ABSTRACT

An auxiliary positioning bracket, including: a positioning bracket, and a laser device arranged on the positioning bracket. The positioning bracket has a first end portion and a second end portion arranged oppositely to the first end portion. The first end portion is formed with a first abutment surface, which is configured to abut against a tire outer lateral surface, and a second abutment surface, which is perpendicular to the first abutment surface and configured to abut against a horizontal plane of a calibration site. The positioning bracket is also formed with a measurement surface which is parallel to the second abutment surface. The laser device is arranged at the second end portion and configured to project a line laser onto the tire outer lateral surface, and a plane where the line laser is located is perpendicular to the measurement surface.

18 Claims, 2 Drawing Sheets

(58) Field of Classification Search
USPC .................................... 33/203, 203.15, 288
See application file for complete search history.

(56) References Cited

U.S. PATENT DOCUMENTS

| | | | | | |
|---|---|---|---|---|---|
| 4,432,145 | A * | 2/1984 | Caroff | G01B 5/255 33/336 |
| 4,601,105 | A * | 7/1986 | Yamazaki | G01B 5/20 33/600 |
| 4,918,821 | A * | 4/1990 | Bjork | G01B 11/275 33/203.18 |
| 5,125,164 | A * | 6/1992 | Fournier | G01B 11/27 33/608 |
| 6,151,562 | A * | 11/2000 | Merrill | H04N 7/183 348/E7.087 |
| 6,522,400 | B1 * | 2/2003 | Horn | G01B 11/275 356/138 |
| 7,886,447 | B2 * | 2/2011 | Cruz | B26D 7/28 33/41.5 |
| 8,638,452 | B2 * | 1/2014 | Muhle | G01B 11/25 356/615 |
| 11,162,785 | B2 * | 11/2021 | Newkirk | G01B 11/275 |
| 11,953,315 | B2 * | 4/2024 | Inoue | G01M 17/013 |
| 12,013,483 | B2 * | 6/2024 | Liu | F16M 11/18 |
| 2006/0185180 | A1 * | 8/2006 | MacKelvie | G01B 5/255 33/203.18 |
| 2009/0059213 | A1 * | 3/2009 | Wesby | G01M 17/06 356/139.09 |
| 2022/0073036 | A1 | 3/2022 | Jackson, Jr. | |
| 2025/0172386 | A1 * | 5/2025 | Zhan | G01B 11/2755 |

FOREIGN PATENT DOCUMENTS

| | | | |
|---|---|---|---|
| CN | 111721271 | A | 9/2020 |
| CN | 111801546 | A | 10/2020 |
| CN | 212379562 | U | 1/2021 |
| CN | 114442053 | A | 5/2022 |

* cited by examiner

AUXILIARY POSITIONING BRACKET AND VEHICLE CALIBRATION SYSTEM

CROSS-REFERENCE TO RELATED APPLICATIONS

This application is the U.S. national phase of International Application No. PCT/CN2023/138779 with an international filing date of Dec. 14, 2023, designating the U.S., now pending, and claims the priority of the Chinese patent application submitted to the CNIPA on Oct. 24, 2023, with an application number 202322858865.9 and titled "AUXILIARY POSITIONING BRACKET AND VEHICLE CALIBRATION SYSTEM", the entire contents of which are incorporated by reference in this application.

TECHNICAL FIELD

The present application relates to the technical field of the vehicle calibration system, more particularly to an auxiliary positioning bracket and a vehicle calibration system.

BACKGROUND

In the field of vehicle maintenance, before using calibration device to calibrate an advanced driver assistant systems (ADAS), a four-wheel aligner, etc. of the vehicle, a calibration device needs to be placed in a proper position so as to align the calibration device with the vehicle and keep the calibration device perpendicular to a central axis of the vehicle. If the calibration device deviates from the central axis of the vehicle with a relatively large angle, a large deviation in the calibration function or inaccurate calibration will be resulted, and the calibrated functions will cause safety hazards to the vehicle.

At present, the method of aligning the calibration device with the vehicle requires an auxiliary target. However, the existing auxiliary target is easily to offset from the center of the vehicle tire during alignment, which causes errors in the calibration function of the calibration device and results in low calibration accuracy.

SUMMARY

It is an object of the present application to provide an auxiliary positioning bracket and a vehicle calibration system, so as to solve the problem that the existing auxiliary target is easily to offset from the center of the vehicle tire during alignment, which causes errors in the calibration function of the calibration device and results in low calibration accuracy.

In order to achieve the above objects, the following technical solutions are adopted:

In a first aspect, an auxiliary positioning bracket is provided. The auxiliary positioning bracket comprises:

a positioning bracket, and a laser device arranged on the positioning bracket. The positioning bracket has a first end portion and a second end portion arranged oppositely to the first end portion. The first end portion is formed with a first abutment surface, which is configured to abut against a tire outer lateral surface, and a second abutment surface, which is perpendicular to the first abutment surface and configured to abut against a horizontal plane of a calibration site. The positioning bracket is also formed with a measurement surface which is parallel to the second abutment surface. The laser device is arranged at the second end portion and configured to project a line laser onto the tire outer lateral surface, and a plane where the line laser is located is perpendicular to the measurement surface.

By adopting the above technical solution, the first abutment surface, the second abutment surface, and the measurement surface are formed on the positioning bracket, so that the positioning bracket is able to make the measurement surface parallel to the horizontal plane by abutting against the tire outer lateral surface and the horizontal plane, thereby keeping the laser device in a horizontal state and projecting the line laser perpendicular to the tire outer lateral surface, which is conducive to aligning the line laser with the center of the tire outer lateral surface, being not prone to misalignment. Moreover, it is easier to measure the distance between the calibration device and the center of the tire outer lateral surface, which reduces measurement errors and improves the accuracy of the measured distance value, thus improving the calibration accuracy of the calibration device.

In an embodiment, the second end portion is provided with a laser device fixing plate, and the laser device is in detachable connection with the laser device fixing plate.

By adopting the above technical solution, the detachable design of the laser device enables multiple auxiliary positioning brackets to share a single laser device, which improves the utilization rate of the laser device and reduces the manufacturing cost of the auxiliary positioning bracket.

In an embodiment, the laser device fixing plate is a magnetic plate, and the laser device is configured to be magnetically suctioned onto the magnetic plate, to realize a detachable connection between the laser device and the magnetic plate.

By adopting the above technical solution, the laser device is fixed on the magnetic plate through magnetic attraction, which is conducive to the installation and disassembling thereof, thus improving the convenience of use.

In an embodiment, at least two magnetic pieces are provided on the magnetic plate. A line connecting centers of the at least two magnetic pieces is parallel to the measurement surface and perpendicular to a length direction of the positioning bracket. The laser device is provided with magnetic components that respectively correspond to the magnetic pieces.

By adopting the above technical solution, the plane where the line laser is projected by the laser device is perpendicular to the measurement surface, which ensures that the line laser is perpendicular to the tire outer lateral surface, reduces the possibility of misalignment of the line laser, and improves the measurement accuracy.

In an embodiment, the laser device fixing plate is provided with a hanging piece, and the laser device is provided with a fastener which is in detachable connection with the hanging piece.

By adopting the above technical solution, the laser device can also be fixed by the cooperation between the hanging piece and the fastener, the fixation of which is highly stable. In addition, the laser device of this embodiment can be fixed at the laser device fixing plate by the fixing manner via the magnetic attraction as well as the fixing manner via the hanging piece at the same time, which further improves the fixing stability of the laser device.

In an embodiment, the laser device fixing plate is also provided with a ruler positioning plate. The ruler positioning plate has a positioning groove configured for cooperating with the ruler. The positioning groove is located on an extension line of the line laser.

By adopting the above technical solution, the distance between the calibration device and the auxiliary positioning bracket is measured, and the measurement method is simple and highly reliable.

In an embodiment, the laser device fixing plate is provided with a handle.

By adopting the above technical solution, the operator can lift the entire auxiliary positioning bracket through the handle, which is convenient to the transfer of the auxiliary positioning bracket.

In an embodiment, the first end portion is formed with a first support foot, which protrudes downward from the first end portion. The laser device fixing plate is formed with a second support foot, which protrudes downward from the second end portion. A protruding length of the second support foot is equivalent to a protruding length of the first support foot, to enable the measurement surface to be parallel to the horizontal plane of the calibration site.

By adopting the above technical solution, the protruding lengths of the first supporting foot and the second supporting foot are the same, so that the measurement surface of the positioning bracket can be parallel to the horizontal plane, the plane where the line laser is projected by the laser device can be perpendicular to the tire outer lateral surface, which reduces the possibility of misalignment of the line laser and improves the measurement accuracy.

In an embodiment, the first support foot is convex to form at least two first feet, which are spaced apart from each other, and the first feet protrude toward the horizontal plane of the calibration site. The second support foot is convex to form at least two second feet, which are spaced apart from each other, and the second feet protrude toward the horizontal plane of the calibration site.

By adopting the above technical solution, the impact on the entire positioning bracket is reduced and the measurement accuracy is improved.

In a second aspect, a vehicle calibration system is provided. The vehicle calibration system comprises a calibration device and the auxiliary positioning bracket as described in the above. The auxiliary positioning bracket is configured to assist in positioning the calibration device.

By adopting the above technical solution, in addition to the advantages of the auxiliary positioning bracket of the above embodiments, the vehicle calibration system of this embodiment also has the advantage of high calibration accuracy.

BRIEF DESCRIPTION OF THE DRAWINGS

In order to more clearly illustrate the technical solutions in embodiments of the present application, accompanying drawings that need to be used in the embodiments or exemplary technical descriptions will be briefly introduced hereinbelow. Obviously, the accompanying drawings in the following descriptions are only some embodiments, those skilled in the art can also obtain other drawings based on these drawings without creative efforts.

Figure 1:
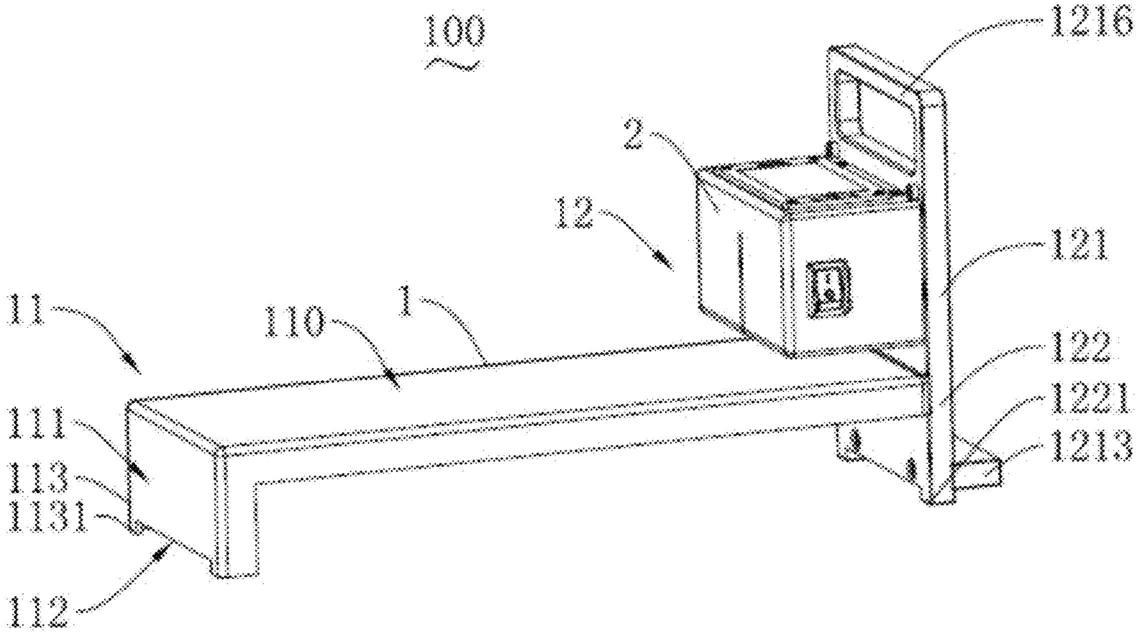
FIG. 1 is a perspective structural schematic view of an auxiliary positioning bracket provided by an embodiment of the present application.

Reference numerals in the figures are as follows:

- 100: Auxiliary positioning bracket; 200: Tire outer lateral surface; 300: Calibration device;
- 1: Positioning bracket; 2: Laser device;
- 11: First end portion; 12: Second end portion; 21: Line laser;
- 110: Measurement surface; 111: First abutment surface; 112: Second abutment surface; 113: First support foot; 121: Laser device fixing plate; 122: Second support foot;
- 1211: Magnetic piece; 1212: Hanging piece; 1213: Ruler positioning plate; 1214: Positioning groove; 1215: Ruler; 1216: Handle; 1131: First foot; and 1221: Second foot.

DETAILED DESCRIPTION OF THE EMBODIMENTS

In order to make the technical problems, technical solutions and beneficial effects to be solved by the present application clearer, the present application will be further described in detail below in conjunction with the accompanying drawings and embodiments. It should be understood that the specific embodiments described here are only configured to explain the present application, but are not intended to limit the present application.

It should be noted that when an element is referred to as being "fixed at" or "arranged at" another element, it can be directly on the other element or indirectly at the other element. When an element is referred to as being "connected to" another element, it may be directly connected or indirectly connected to the other element.

It should be understood that the orientation or positional relationship indicated by the terms "length", "width", "upper", "lower", "vertical", "horizontal", "inner", and "outer", etc. are based on the drawings. The orientation or positional relationship shown is only for the convenience of describing the present application and simplifying the description, and does not indicate or imply that the device or element referred to must have a specific orientation, be constructed and operated in a specific orientation, and therefore cannot be interpreted as limiting the scope of the present application.

Figure 2:
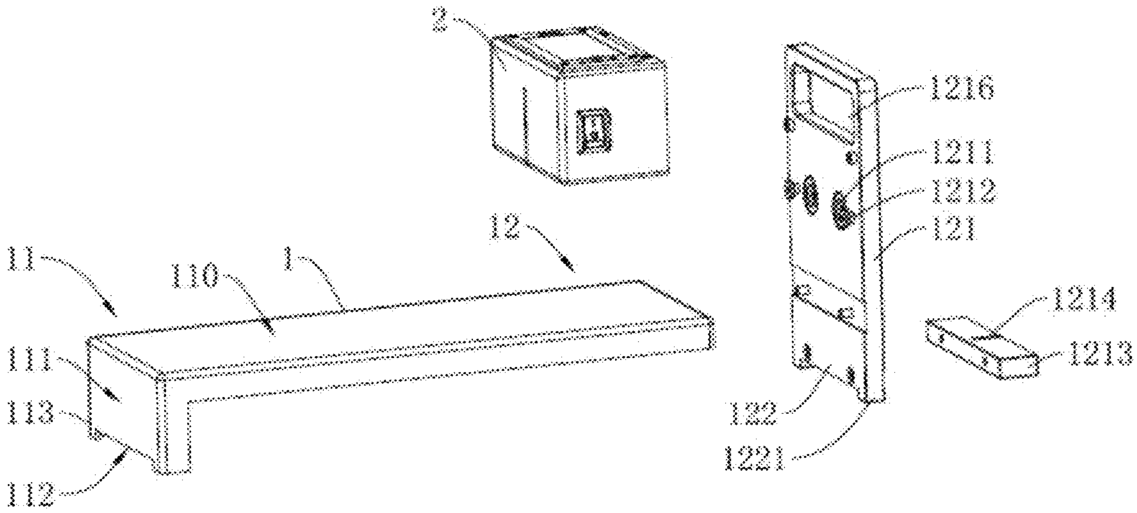
FIG. 2 is an exploded view of an auxiliary positioning bracket provided by an embodiment of the present application.
Figure 3:
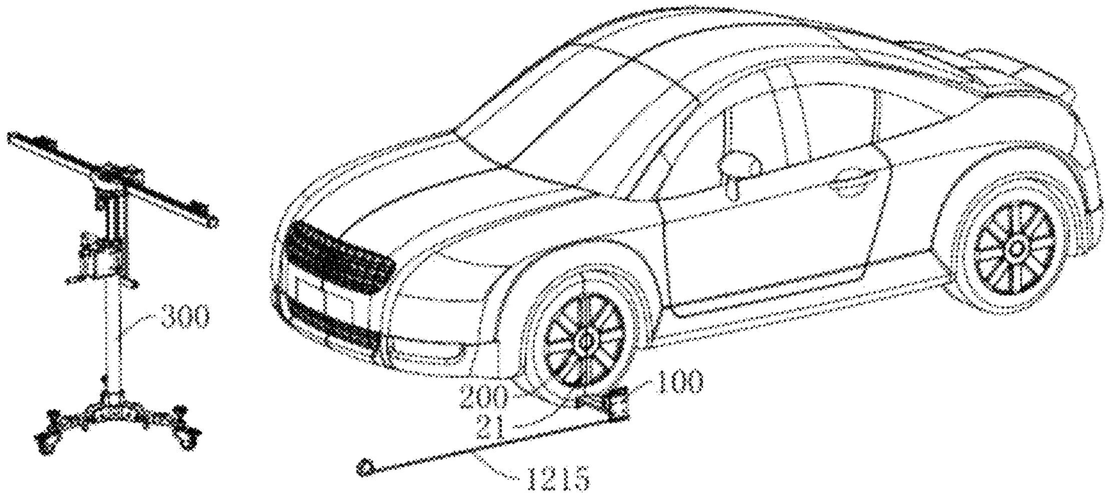
FIG. 3 is a schematic diagram of an auxiliary positioning bracket during use provided by an embodiment of the present application.

Furthermore, the terms "first" and "second" are used for descriptive purposes only and shall not be understood as indicating relative importance or indicating the quantity of technical features. In the description of this application, "plurality" means two or more than two, unless otherwise explicitly and specifically limited. The specific implementation of the present application is described in more detail hereinbelow in conjunction with specific embodiments:

As shown in FIGS. 1-3, an auxiliary positioning bracket provided by embodiments of the present application is configured to assist in positioning a calibration device 300, so that the calibration device 300 is in a correct calibration position to perform calibration operations on a vehicle, which will be further explained in detail hereinbelow in conjunction with detailed implementations.

The auxiliary positioning bracket 100 in an embodiment comprises:

- a positioning bracket 1, and a laser device 2 arranged on the positioning bracket 1. The positioning bracket 1 has a first end portion 11 and a second end portion 12 arranged oppositely to the first end portion 11. The first end portion 11 is formed with a first abutment surface 111, which is configured to abut against a tire outer lateral surface 200, and a second abutment surface 112, which is perpendicular to the first abutment surface 111 and configured to abut against a horizontal plane of a calibration site. The positioning bracket 1 is also formed with a measurement surface 110 which is parallel to the second abutment surface 112. The laser device 2 is arranged at the second end portion 12 and configured to project a line laser 21 onto the tire outer lateral surface 200, and a plane where the line laser 21 is located is perpendicular to the measurement surface 110.

The positioning bracket 1 is configured to abut against the tire outer lateral surface 200 and support the laser device 2. Specifically, the positioning bracket 1 has the first end portion 11 and the second end portion 12, and the first end portion 11 and the second end portion 12 are arranged oppositely to each other. The first end portion 11 is formed with the first abutment surface 111 and the second abutment surface 112. The first abutment surface 111 is configured to abut against the tire outer lateral surface 200. When the first abutment surface 111 abuts against the tire outer lateral surface 200, a length direction of the positioning bracket 1 is perpendicular to the tire outer lateral surface 200. Herein, in this embodiment, the tire outer lateral surface 200 refers to a plane where a wheel hub and a tire part around the wheel hub are located. The second abutment surface 112 is perpendicular to the first abutment surface 111, and the second abutment surface 112 is configured to abut against the horizontal plane of the calibration site. Herein, in this embodiment, the calibration site may be a maintenance workshop, and the horizontal plane may be a ground surface of the maintenance workshop. Since the vehicle is parked in a horizontal plane, the tire outer lateral surface 200 is perpendicular to the horizontal plane. In such condition, when the first abutment surface 111 abuts against the tire outer lateral surface 200, as the second abutment surface 112 is perpendicular to the first abutment surface 111, the second abutment surface 112 is able to abut against the horizontal plane in a parallel manner. The positioning bracket 1 is further formed with the measurement surface 110, which is perpendicular to the first abutment surface 111, in this way, when the first abutment surface 111 and the second abutment surface 112 abut against the tire outer lateral surface 200 and the horizontal plane, respectively, since the measurement surface 110 is parallel to the second abutment surface 112, the measurement surface 110 is parallel to the horizontal plane.

The laser device 2 is located at the second end portion 12 of the positioning bracket 1, so that the laser device 2 is spaced apart from the tire outer lateral surface 200 with a certain distance, and the laser device 2 is able to project the line laser 21 onto the tire outer lateral surface 200. The plane where the line laser 21 is located is perpendicular to the measurement surface 110, such that the plane where the line laser 21 is located can be perpendicular to the tire outer lateral surface 200.

Working principle of the auxiliary positioning bracket 100 provided in embodiments is summarized as follows:

The vehicle is parked in the calibration site, and the tires of the vehicle are aligned. In such condition, the tire outer lateral surface 200 is perpendicular to the horizontal plane. The positioning bracket 1 is placed on the horizontal plane and abuts against the tire outer lateral surface 200. Specifically, the first abutment surface 111 of the end portion 11 of the positioning bracket 1 abuts against the tire outer lateral surface 200, and the second abutment surface 112 abuts against the horizontal plane, so that the measurement surface 110 remains parallel to the horizontal plane. In such condition, the laser device 2 is started to project a line laser 21 toward the tire outer lateral surface 200. While keeping the first abutment surface 111 abutting against a the tire outer lateral surface 200 and the second abutment surface 112 abutting against the horizontal plane, the positioning bracket 1 is moved to enable the line laser 21 to be aligned with a center of the tire outer lateral surface 200, that is, that is, the center of the tire outer lateral surface 200 is located at the line laser 21 or at an extension line of the line laser 21. In such condition, the positioning of the auxiliary positioning bracket 100 relative to the tire outer lateral surface 200 is completed, and the calibration device 300 can obtain a distance from the auxiliary positioning bracket 100, so as to obtain a distance from the center of the tire outer lateral surface 200, thereby calibrating its own position.

By adopting the above technical solution, the first abutment surface 111, the second abutment surface 112, and the measurement surface 110 are formed on the positioning bracket 1, so that the positioning bracket 1 is able to make the measurement surface 110 parallel to the horizontal plane by abutting against the tire outer lateral surface 200 and the horizontal plane, thereby keeping the laser device 2 in a horizontal state and projecting the line laser 21 perpendicular to the tire outer lateral surface 200, which is conducive to aligning the line laser 21 with the center of the tire outer lateral surface 200, being not prone to misalignment. Moreover, it is easier to measure the distance between the calibration device 300 and the center of the tire outer lateral surface 200, which reduces measurement errors and improves the accuracy of the measured distance value, thus improving the calibration accuracy of the calibration device 300.

In an embodiment, the second end portion 12 is provided with a laser device fixing plate 121, and the laser device 2 is in detachable connection with the laser device fixing plate 121.

Herein, it can be understood that the laser device 2 adopts a detachable design, so that after measuring a calibration point on the tire outer lateral surface 200, the laser device 2 can be detached from the laser device fixing plate 121 and installed at another laser device fixing plate 121 to form another auxiliary positioning bracket 100, so as to measure a calibration point of another tire outer lateral surface 200. In this way, due to the high cost of the laser device 2, one laser device 2 can be used with multiple laser device fixing plates 121 to form multiple auxiliary positioning brackets 100, thus improving the utilization rate of laser device 2.

By adopting the above technical solution, the detachable design of the laser device 2 enables multiple auxiliary positioning brackets 100 to share a single laser device 2, which improves the utilization rate of the laser device 2 and reduces the manufacturing cost of the auxiliary positioning bracket 100.

In an embodiment, the laser device fixing plate 121 is a magnetic plate, and the laser device 2 is configured to be magnetically suctioned onto the magnetic plate, to realize a detachable connection between the laser device 2 and the magnetic plate.

By adopting the above technical solution, the laser device 2 is fixed on the magnetic plate through magnetic attraction, which is conducive to the installation and disassembling thereof, thus improving the convenience of use.

In an embodiment, at least two magnetic pieces 1211 are provided on the magnetic plate. A line connecting centers of the at least two magnetic pieces 1211 is parallel to the measurement surface 110 and perpendicular to a length direction of the positioning bracket 1. The laser device 2 is provided with magnetic components that respectively correspond to the magnetic pieces 1211.

Herein, it can be understood that the magnetic pieces 1211 are used to magnetically suction to the corresponding magnetic components, respectively, so that the laser device 2 is suctioned on the magnetic plate. The line connecting centers of the at least two magnetic pieces 1211 is parallel to the measurement surface 110 and perpendicular to the length direction of the positioning bracket 1, such that when the laser device 2 is fixed on the magnetic plate via the cooperation of the magnetic components and the magnetic pieces 1211, the laser device 2 is maintained correctly in place, and the plane where the line laser 21 is projected by the laser device 2 is perpendicular to the measurement surface 110.

Specifically, both the magnetic pieces 1211 and the magnetic components may adopt a magnetic metal.

By adopting the above technical solution, the plane where the line laser 21 is projected by the laser device 2 is perpendicular to the measurement surface 110, which ensures that the line laser 21 is perpendicular to the tire outer lateral surface 200, reduces the possibility of misalignment of the line laser 21, and improves the measurement accuracy.

In an embodiment, the laser device fixing plate 121 is provided with a hanging piece 1212, and the laser device 2 is provided with a fastener which is in detachable connection with the hanging piece 1212.

Herein, it can be understood that the hanging piece 1212 can be a hook, and the fastener can be a groove fitting with the hook.

By adopting the above technical solution, the laser device 2 can also be fixed by the cooperation between the hanging piece 1212 and the fastener, the fixation of which is highly stable. In addition, the laser device 2 of this embodiment can be fixed at the laser device fixing plate 121 by the fixing manner via the magnetic attraction as well as the fixing manner via the hanging piece 1212 at the same time, which further improves the fixing stability of the laser device 2.

In an embodiment, the laser device fixing plate 121 is also provided with a ruler positioning plate 1213. The ruler positioning plate 1213 has a positioning groove 1214 configured for cooperating with the ruler 1215. The positioning groove 1214 is located on an extension line of the line laser 21.

Herein, it can be understood that the ruler 1215 includes but is not limited to a tape measure, and the ruler 1215 is used to measure the distance from the center of the tire outer lateral surface 200 to the calibration device 300. Specifically, the ruler positioning plate 1213 is provided with the positioning groove 1214, and the positioning groove 1214 is located on the extension line of the line laser 21. When the line laser 21 is aligned with the center of the tire outer lateral surface 200, then the positioning groove 1214 is also aligned with the tire outer lateral surface 200. In such condition, one end of the ruler 1215 is aligned with the positioning grooves 1214, the other end of the ruler 1215 is placed toward the calibration device 300, and the calibration device 300 is aligned with the scale on the ruler 1215 to place the calibration device 300 at a suitable measurement position.

It should be further explained that when the ruler 1215 is a tape measure, one end of the tape measure is inserted into the positioning groove 1214, the other end of the tape measure is pulled out towards the calibration device 300, and the calibration device 300 is then aligned with the scale on the tape measure, so as to place the calibration device 300 at the suitable measurement position.

By adopting the above technical solution, the distance between the calibration device 300 and the auxiliary positioning bracket 100 is measured, and the measurement method is simple and highly reliable.

In an embodiment, the laser device fixing plate 121 is provided with a handle 1216.

By adopting the above technical solution, the operator can lift the entire auxiliary positioning bracket 100 through the handle 1216, which is convenient to the transfer of the auxiliary positioning bracket 100.

In an embodiment, the first end portion 11 is formed with a first support foot 113, which protrudes downward from the first end portion 11. The laser device fixing plate 121 is formed with a second support foot 122, which protrudes downward from the second end portion 12. A protruding length of the second support foot 122 is equivalent to a protruding length of the first support foot 113, to enable the measurement surface 110 to be parallel to the horizontal plane of the calibration site.

Herein, it can be understood that both the first supporting foot 113 and the second supporting foot 122 are used to support the positioning bracket 1 so that the positioning bracket 1 has a certain height from the horizontal plane. The protruding length of the second support foot 122 is equivalent to a protruding length of the first support foot 113, that is, the first support foot 113 and the second support foot 122 enable the measurement surface 110 of the positioning bracket 1 to be parallel to the horizontal plane, which can ensure that the plane where the line laser 21 is projected by the laser device 2 is perpendicular to the tire outer lateral surface 200.

It should be further explained that a bottom surface of the first supporting feet 113 and a bottom surface of the second supporting feet 122 form the second abutment surface 112.

By adopting the above technical solution, the protruding lengths of the first supporting foot 113 and the second supporting foot 122 are the same, so that the measurement surface 110 of the positioning bracket 1 can be parallel to the horizontal plane, the plane where the line laser 21 is projected by the laser device 2 can be perpendicular to the tire outer lateral surface 20, which reduces the possibility of misalignment of the line laser 21 and improves the measurement accuracy.

In an embodiment, the first support foot 113 is convex to form at least two first feet, which are spaced apart from each other, and the first feet 1131 protrude toward the horizontal plane of the calibration site. The second support foot 122 is convex to form at least two second feet, which are spaced apart from each other, and the second feet 1221 protrude toward the horizontal plane of the calibration site.

Herein, it can be understood that the first feet 1131 are used to reduce the impact of the slight unevenness of the ground surface of the calibration site on the first support foot 113. Specifically, the first feet 1131 make the first support foot 113 out of the horizontal plane and reduce the contact area with the ground, thus reducing the impact of the ground tilt on the first support foot 113, and further reducing the impact on the entire positioning bracket 1. Similarly, the second support foot 1221 reduces the impact of slight unevenness of the ground surface of the calibration site on the first support foot 113, thereby reducing the impact on the entire positioning bracket 1.

By adopting the above technical solution, the impact on the entire positioning bracket 1 is reduced and the measurement accuracy is improved.

In a second aspect, a vehicle calibration system is provided. The vehicle calibration system 300 comprises a calibration device 300 and the auxiliary positioning bracket 100 as described in the above. The auxiliary positioning bracket 100 is configured to assist in positioning the calibration device 300.

Herein, it can be understood that the vehicle calibration system of embodiments of the present application comprises at least two auxiliary positioning brackets 100, and two front wheels of the vehicle are respectively provided with auxiliary positioning brackets 100.

By adopting the above technical solution, in addition to the advantages of the auxiliary positioning bracket 100 of the above embodiments, the vehicle calibration system of this embodiment also has the advantage of high calibration accuracy.

The above descriptions are only preferred embodiments of the present application, and are not intended to limit the present application. Any modifications, equivalent replacements, and improvements made within the spirit and principles of the present application should be included within in the protection scope of the present application.

The invention claimed is:

1. An auxiliary positioning bracket, comprising:
a positioning bracket, and
a laser device arranged on the positioning bracket;
wherein
the positioning bracket has a first end portion and a second end portion arranged oppositely to the first end portion;
the first end portion is formed with a first abutment surface, which is configured to abut against a tire outer lateral surface, and a second abutment surface, which is perpendicular to the first abutment surface and configured to abut against a horizontal plane of a calibration site;
the positioning bracket is also formed with a measurement surface which is parallel to the second abutment surface; and
the laser device is arranged at the second end portion and configured to project a line laser onto the tire outer lateral surface, and a plane where the line laser is located is perpendicular to the measurement surface.

2. The auxiliary positioning bracket according to claim 1, wherein the second end portion is provided with a laser device fixing plate, and the laser device is in detachable connection with the laser device fixing plate.

3. The auxiliary positioning bracket according to claim 2, wherein the laser device fixing plate is a magnetic plate, and the laser device is configured to be magnetically suctioned onto the magnetic plate, to realize a detachable connection between the laser device and the magnetic plate.

4. The auxiliary positioning bracket according to claim 3, wherein
at least two magnetic pieces are provided on the magnetic plate;
a line connecting centers of the at least two magnetic pieces is parallel to the measurement surface and perpendicular to a length direction of the positioning bracket; and
the laser device is provided with magnetic components that respectively correspond to the magnetic pieces.

5. The auxiliary positioning bracket according to claim 2, wherein the laser device fixing plate is provided with a hanging piece, and the laser device is provided with a fastener which is in detachable connection with the hanging piece.

6. The auxiliary positioning bracket according to claim 2, wherein
the laser device fixing plate is further provided with a ruler positioning plate;
the ruler positioning plate has a positioning groove configured for cooperating with the ruler; and
the positioning groove is located on an extension line of the line laser.

7. The auxiliary positioning bracket according to claim 2, wherein the laser device fixing plate is provided with a handle.

8. The auxiliary positioning bracket according to claim 2, wherein
the first end portion is formed with a first support foot, which protrudes downward from the first end portion;
the laser device fixing plate is formed with a second support foot, which protrudes downward from the second end portion;
a protruding length of the second support foot is equivalent to a protruding length of the first support foot, to enable the measurement surface to be parallel to the horizontal plane of the calibration site.

9. The auxiliary positioning bracket according to claim 8, wherein
the first support foot is convex to form at least two first feet, which are spaced apart from each other, and the first feet protrude toward the horizontal plane of the calibration site; and
the second support foot is convex to form at least two second feet, which are spaced apart from each other, and the second feet protrude toward the horizontal plane of the calibration site.

10. A vehicle calibration system, comprising: a calibration device and the auxiliary positioning bracket claim 1, wherein the auxiliary positioning bracket is configured to assist in positioning the calibration device.

11. The vehicle calibration system according to claim 10, wherein the second end portion is provided with a laser device fixing plate, and the laser device is in detachable connection with the laser device fixing plate.

12. The vehicle calibration system according to claim 11, wherein the laser device fixing plate is a magnetic plate, and the laser device is configured to be magnetically suctioned onto the magnetic plate, to realize a detachable connection between the laser device and the magnetic plate.

13. The vehicle calibration system according to claim 12, wherein
at least two magnetic pieces are provided on the magnetic plate;
a line connecting centers of the at least two magnetic pieces is parallel to the measurement surface and perpendicular to a length direction of the positioning bracket; and
the laser device is provided with magnetic components that respectively correspond to the magnetic pieces.

14. The vehicle calibration system according to claim 11, wherein the laser device fixing plate is provided with a hanging piece, and the laser device is provided with a fastener which is in detachable connection with the hanging piece.

15. The vehicle calibration system according to claim 11, wherein
the laser device fixing plate is further provided with a ruler positioning plate;
the ruler positioning plate has a positioning groove configured for cooperating with the ruler; and
the positioning groove is located on an extension line of the line laser.

16. The vehicle calibration system according to claim 11, wherein the laser device fixing plate is provided with a handle.

17. The vehicle calibration system according to claim 11, wherein the first end portion is formed with a first support foot, which protrudes downward from the first end portion;

the laser device fixing plate is formed with a second support foot, which protrudes downward from the second end portion;

a protruding length of the second support foot is equivalent to a protruding length of the first support foot, to enable the measurement surface to be parallel to the horizontal plane of the calibration site.

18. The vehicle calibration system according to claim 17, wherein the first support foot is convex to form at least two first feet, which are spaced apart from each other, and the first feet protrude toward the horizontal plane of the calibration site; and the second support foot is convex to form at least two second feet, which are spaced apart from each other, and the second feet protrude toward the horizontal plane of the calibration site.

* * * * *